T. PHILBIN & W. M. MONAHAN.
HUB LINER FOR LOCOMOTIVE WHEELS.
APPLICATION FILED DEC. 20, 1912.
1,070,983.
Patented Aug. 19, 1913.
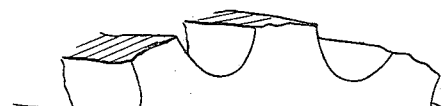

UNITED STATES PATENT OFFICE.

THOMAS PHILBIN AND WILLIAM M. MONAHAN, OF PARIS, TENNESSEE, ASSIGNORS OF ONE-FOURTH TO F. J. MONAHAN AND ONE-FOURTH TO WILLIAM MAHONEY, BOTH OF PARIS, TENNESSEE.

HUB-LINER FOR LOCOMOTIVE-WHEELS.

1,070,983.     Specification of Letters Patent.     Patented Aug. 19, 1913.

Application filed December 20, 1912. Serial No. 737,883.

*To all whom it may concern:*

Be it known that we, THOMAS PHILBIN and WILLIAM M. MONAHAN, citizens of the United States, residing at Paris, in the county of Henry and State of Tennessee, have invented a certain new and useful Hub-Liner for Locomotive-Wheels, of which the following is a specification.

This invention relates, generally, to wear plates for the hubs of wheels, and particularly to what is known as "hub liners" for steam and electric locomotive drive wheels, truck wheels, and trailer wheels, and it has for its object to provide a simple, durable, and exceedingly inexpensive hub liner which may be quickly and readily applied without dropping the wheel, and it consists of the parts and combination of parts hereinafter described and claimed.

In the accompanying drawing, forming a part of this specification, Figure 1 is a perspective view of the hub of a wheel and axle showing the liner in place. Fig. 2 is a vertical section through the hub. Fig. 3 is a perspective showing the sections forming the hub liner, removed from the hub. Fig. 4 is a detail perspective view of one of the anchors employed to secure the liner sections together.

Similar numerals refer to similar parts throughout the several views.

So far as we are aware it is the universal practice in railroad shops to secure liners to the hubs of locomotive wheels rigidly so that they are practically integral therewith. To accomplish this it is necessary to drop the wheels and a consequent loss of use of the locomotive for a period of three or more days results. Aside from the loss of use of the locomotive while the liner is being applied the rigid application thereof to the hub prevents the application of oil to both sides of the liner without weakening the hub by forming openings therein, and such liners being fast to and turning with the wheel grind against the box and are rapidly worn away.

It is the purpose of our invention to obviate the objectionable features noted above and to provide a liner which may be very quickly applied to the hub without dropping the wheel and to be loosely but securely held in position on the axle so as to be free to turn thereon independent of the movement of the wheel and this we accomplish by forming the liner, preferably, of two semi-circular sections held together by anchors.

In the drawings we have shown a fragment of a locomotive wheel, 2, an axle 3, and a part of a drive box 4, but such parts form no part of our invention and they may be of the usual or any preferred type.

In carrying out our invention we provide the semi-circular sections 5, said sections being cast to shape and of a diameter, when brought together, to partly cover the face of the hub of the wheel and to surround the axle opening therein. The circular opening formed in the liner for the axle 3 is of a diameter to loosely fit the axle so that said liner may be free to turn thereon. In the meeting edges of the sections at each side of the axle opening 7, a slot 8 is formed, said slot comprising, in this instance, a narrow, straight channel which extends into the body of the section and terminates in a wider circular shaped opening 9 in the body of the sections. The sections are secured together by anchors 10 which are identical in shape to the shape given the slots when the sections are brought together edgewise as shown in Fig. 2, and slightly shorter in length than the length of the slots 8 when the sections are in position.

In applying the liner to a hub it is only necessary to remove the oil cellar from the journal box and mount the sections on the axle next the face of the hub and hold the same in position while the anchors are being inserted. The anchors are first heated, thereby expanding the same, and inserted in the slots while hot. The cooling off of the anchors cause them to shrink or contract and draw the edges of the sections into contact and thereby rigidly secure them together. While we have shown the slots as terminating in rounded openings, and slots so shaped have been found to give excellent results in practice, we do not desire to be confined to the specific shape of opening shown since it is obvious that the opening may be square in shape or triangular and equally good results be obtained since the only essential is that it be wider than the slot which enters the same.

Having thus described our invention what we claim is:

1. A hub liner for locomotive wheels, comprising semi-circular sections having slots formed in their meeting edges, and anchors corresponding in shape to said slots for rigidly securing said sections together.

2. A hub liner for locomotive wheels, comprising semi-circular sections having slots formed therein, said slots consisting of a straight channel terminating in an enlarged opening, and anchors adapted to fill said slots and openings to rigidly secure said sections together.

In testimony whereof, we affix our signatures, in the presence of two witnesses.

THOS. PHILBIN.
WILLIAM M. MONAHAN.

Witnesses:
W. H. SHAFER,
WM. F. MARTIN.